United States Patent
Steinzor

(10) Patent No.: US 7,767,295 B2
(45) Date of Patent: Aug. 3, 2010

(54) REINFORCED PACKING TAPE WITH TAMPER INDICATOR

(76) Inventor: Eric Steinzor, 11 Corwin Ct., Dix Hills, NY (US) 11746

( * ) Notice: Subject to any disclaimer, the term of this patent is extended or adjusted under 35 U.S.C. 154(b) by 460 days.

(21) Appl. No.: 11/589,605

(22) Filed: Oct. 30, 2006

(65) Prior Publication Data

US 2008/0102254 A1    May 1, 2008

(51) Int. Cl.
*B32B 7/12* (2006.01)
(52) U.S. Cl. .................. 428/343; 428/195.1; 428/916; 283/101
(58) Field of Classification Search .................. 428/915, 428/916, 42.3
See application file for complete search history.

(56) References Cited

U.S. PATENT DOCUMENTS

| | | | |
|---|---|---|---|
| 2,895,865 A | | 7/1959 | Humphner |
| 3,631,617 A | * | 1/1972 | Pekko ........................ 283/101 |
| 4,151,319 A | * | 4/1979 | Sackoff et al. ............. 428/41.4 |
| 4,351,877 A | | 9/1982 | Williams |
| 4,358,494 A | * | 11/1982 | Akimoto et al. ............ 428/41.3 |
| 5,080,957 A | | 1/1992 | Leseman et al. |
| 5,098,817 A | * | 3/1992 | Voorhees ..................... 430/396 |
| 5,190,798 A | | 3/1993 | Bloch |
| 5,366,775 A | | 11/1994 | Kao |
| 5,686,180 A | | 11/1997 | Rivlin et al. |
| 5,707,482 A | * | 1/1998 | Fusselman ................... 156/577 |
| 5,804,024 A | * | 9/1998 | Bloch et al. ............... 156/272.6 |
| 5,913,543 A | * | 6/1999 | Curiel .......................... 283/94 |
| 6,124,032 A | | 9/2000 | Bloch et al. |
| 6,670,008 B1 | | 12/2003 | Ognissanti et al. |
| 6,912,798 B2 | | 7/2005 | Blau et al. |

* cited by examiner

*Primary Examiner*—Jennifer C. McNeil
*Assistant Examiner*—Adam C Krupicka
(74) *Attorney, Agent, or Firm*—Scully, Scott, Murphy & Presser, P.C.

(57) ABSTRACT

A reinforced packing tape having a tamper indicator is disclosed. The reinforced packing tape is constructed of a base layer of kraft paper having a lower surface coated with a water-activated adhesive and an upper surface printed with a tamper indicator pattern. A portion of the tamper indicator pattern is overlaid with a reinforcing film of transparent plastic. The plastic film is strongly bonded to the base layer such that when an attempt to remove the plastic film is made, the tamper indicator pattern is altered, degraded or destroyed; thus, a tamper attempt is indicated.

13 Claims, 3 Drawing Sheets

REINFORCED PACKING TAPE WITH TAMPER INDICATOR

I. FIELD OF THE INVENTION

The present invention relates generally to packaging tape. More specifically, the present invention relates to a reinforced packing tape having a tamper indicator and method for manufacturing the same.

II. BACKGROUND OF THE DISCLOSURE

Adhesive tapes for sealing cartons or carton flaps during manufacture or after the carton is filled are well known in the art. One of the most common constructions is a standard kraft paper tape, which includes a water-soluble or water activated adhesive on one side. Rolls of this tape can be dispensed through machines, which rely on the longitudinal stiffness of the tape to unwind it from the roll and force it through a tape-moisturizing component. This component includes a water reservoir, which moistens the adhesive surface of the tape and readies it for application to the carton. Often, the tape-moisturizing component includes a heating bar, which enhances the activation of the moistened adhesive through the use of heat, and facilitates wet-out of the adhesive.

Various improvements to this type of tape have been developed over the years to meet differing requirements in the manufacture and sealing of cartons. For example, multiple layered tapes using reinforcing fibers generally made of fiberglass and extending longitudinally and/or angularly across this tape to increase its strength are conventionally used for higher closure strength requirements. Although the tape is harder to tear due to the reinforcing fibers, this construction results in the somewhat rough and uneven surface both along the top and bottom of the tape as well as a tape construction that is somewhat thicker than the conventional kraft tape. This uneven surface and thicker tape causes a standard size roll to be of a shorter length for any given diameter compared to conventional tapes.

Plastic films are also known in the art to provide advantages when used in tape construction. Plastic films tend to be much stronger than paper tapes and resist shearing during package shipping as is common with non-reinforced paper tape. However, plastic film tapes have disadvantages as well.

One problem in using plastic film is that a water-soluble or water activatable adhesive does not easily adhere to plastic film. A second disadvantage inherent in plastic film tape is the lack of longitudinal rigidity, thus making plastic film tape difficult to feed through conventional packing machine.

Recognizing this problem in adhering the water-activated adhesive to the plastic film, Williams in U.S. Pat. No. 4,351, 877 disclosed a multiple layered laminated tape having an upper strength layer made of a film of prestretched polypropylene, which is laminated to a lower carrier layer of kraft paper. The carrier layer includes a coating of a water-activated adhesive, which is used to apply the tape to a carton. After application, the plastic layer is stripped away from the carton due to the relatively low bond between the plastic film and the paper carrier, so that the package may be easily opened after removal of the plastic film.

Similarly, Bloch U.S. Pat. No. 5,190,798 discloses a paper plastic film fiber glass reinforced sealing tape which includes a paper inner ply whose exposed face is pre-gummed and a synthetic plastic film outer ply which is laminated by a water based adhesive to the inner ply. Sandwiched between the inner and outer plies is a longitudinal array of fiberglass strands, which serve to reinforce the tape. After a corrugated article is sealed by the tape, it is possible to remove the outer ply by stripping it from the tape, again due to the relatively low bond between the plastic film and the inner paper layer.

However, the tape compositions described in Williams and Bloch undermine tamper resistance of the sealed carton by making the plastic film easily removable.

A tape having a reinforcing means and a tamper resisting means that can be applied to a carton using conventional water-activated packing tape dispensing machines is needed.

III. SUMMARY OF THE DISCLOSURE

The present invention addresses the above-identified need in the area of packing tape by providing a tape composed of a base layer of kraft paper with a water-activated adhesive applied to a lower surface and a strip of plastic film applied to an upper surface of the kraft paper. The upper surface of the kraft paper is further imprinted with a tamper indicator pattern prior to application of the plastic film.

The tamper indicator pattern may be a stock pattern, such as thick diagonal lines spanning the width of the kraft paper layer, or custom pattern, such as a corporate logo, company/ organization name, etc. Preferentially, the tamper indicator pattern is wider than and partially overlaid by the plastic film. Thus, attempts to remove the reinforcing strip results in degradation or destruction of the tamper indicator pattern.

Additionally, the present invention a packing tape is disclosed having a base layer formed of paper, the base layer having an upper surface and a lower surface; a water-activated adhesive coating applied to the lower surface of the base layer; a tamper indicator pattern imprinted on the upper surface of the base layer; and a transparent reinforcing film, the reinforcing film being disposed on and bonded to the upper surface of the base layer.

Further, the present invention provides a method for manufacturing a reinforced packing tape with tamper indication as well. The manufacturing method includes providing a first roll of kraft paper having a lower surface coated with a water-activated adhesive; and providing a second roll of a reinforcing film having a lower surface coated with a strong paper/ plastic adhesive. The kraft paper forms a base layer of the reinforced packing tape. The method further includes printing a tamper indicator pattern on an upper surface of the kraft paper and joining the printed kraft paper with the reinforcing film. The joining step bonds the lower surface of the reinforcing film to the upper surface of the printed kraft paper.

IV. BRIEF DESCRIPTION OF THE DRAWINGS

These and other features, aspects, and advantages of the present invention will become better understood with regard to the following description, appended claims, and accompanying drawings wherein:

V. DETAILED DESCRIPTION OF DISCLOSURE

Figure 1:
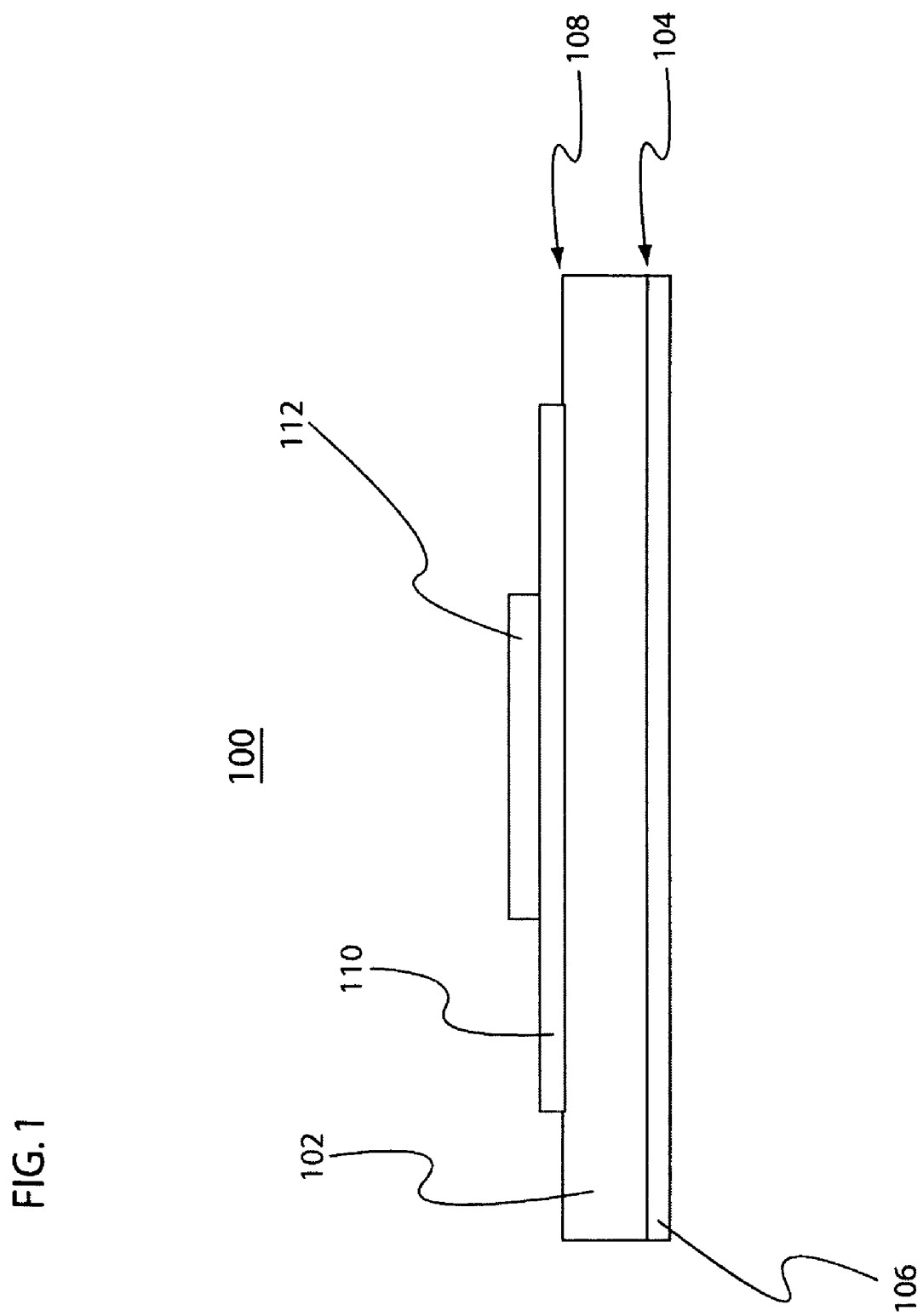
FIG. 1 illustrates a cross-sectional representation of a reinforced tape in accordance with an embodiment of the present invention.

Referring to FIG. 1, a cross-section view representing a reinforced tape 100 in accordance with an embodiment of the present invention is shown. The reinforced tape 100 is formed of a base layer 102 of kraft paper. A lower surface 104 of the base layer 102 is coated with a water-activated adhesive 106. An upper surface 108 of the base layer 102 is imprinted with a tamper indicator pattern 110. The base layer 102 may be dimensioned between 3 and 6 inches wide. However, other standard packing tape widths may be used as well. Preferentially, the base layer is 60 lb kraft paper, however any weight paper between 35 lb and 90 lb may be used.

It should be noted that the reinforced tape 100 and its constituent components are not shown to scale in FIG. 1. Rather the scale of the individual components of the reinforced tape 100 is exaggerated to provide easier identification of the relation of the components to one another. Thus, the tamper indicator pattern 110 is preferentially flush, or nearly so, with the surface of the base layer 102 rather than raised as shown in FIG. 1.

A plastic reinforcing film 112 is adhered to the upper surface 108 of the base layer 102 using an adhesive with strong bonding properties between both plastic and paper materials. The plastic reinforcing film 112 is preferably positioned centrally with respect to the width-wise dimension of the base layer 102 and overlaying a portion of the tamper indicator pattern 110. In addition, the plastic reinforcing film 112 is at least an inch wide and runs the entire length of the base layer 102. However, other widths are contemplated as well in the present invention as necessary for specific situations. The range of appropriate materials for use as plastic reinforcing films in the present invention includes polypropylene, poly-vinyl-chloride (PVC), as well as other transparent, flexible plastic and polymers, preferably having a thickness between 1 mil and 3.1 mil; although, any thickness, which when combined with the selected weight paper base layer yields a reinforced tape of a thickness that can be properly fed through a conventional packing machine is envisioned in the present invention.

Operationally, the strong adhesive bond between the plastic reinforcing film 112 and the upper surface 108 of the base layer 102 provides the tamper indication. If an attempt is made to remove the plastic reinforcing film 112 at least a surface layer of paper fibers would be removed along with the plastic reinforcing film 112. This, in turn, would visibly degrade the printed tamper indicator pattern 110. Thus, visual inspection of a package employing the packing tape of the present invention would identify tampering attempts.

Figure 2:
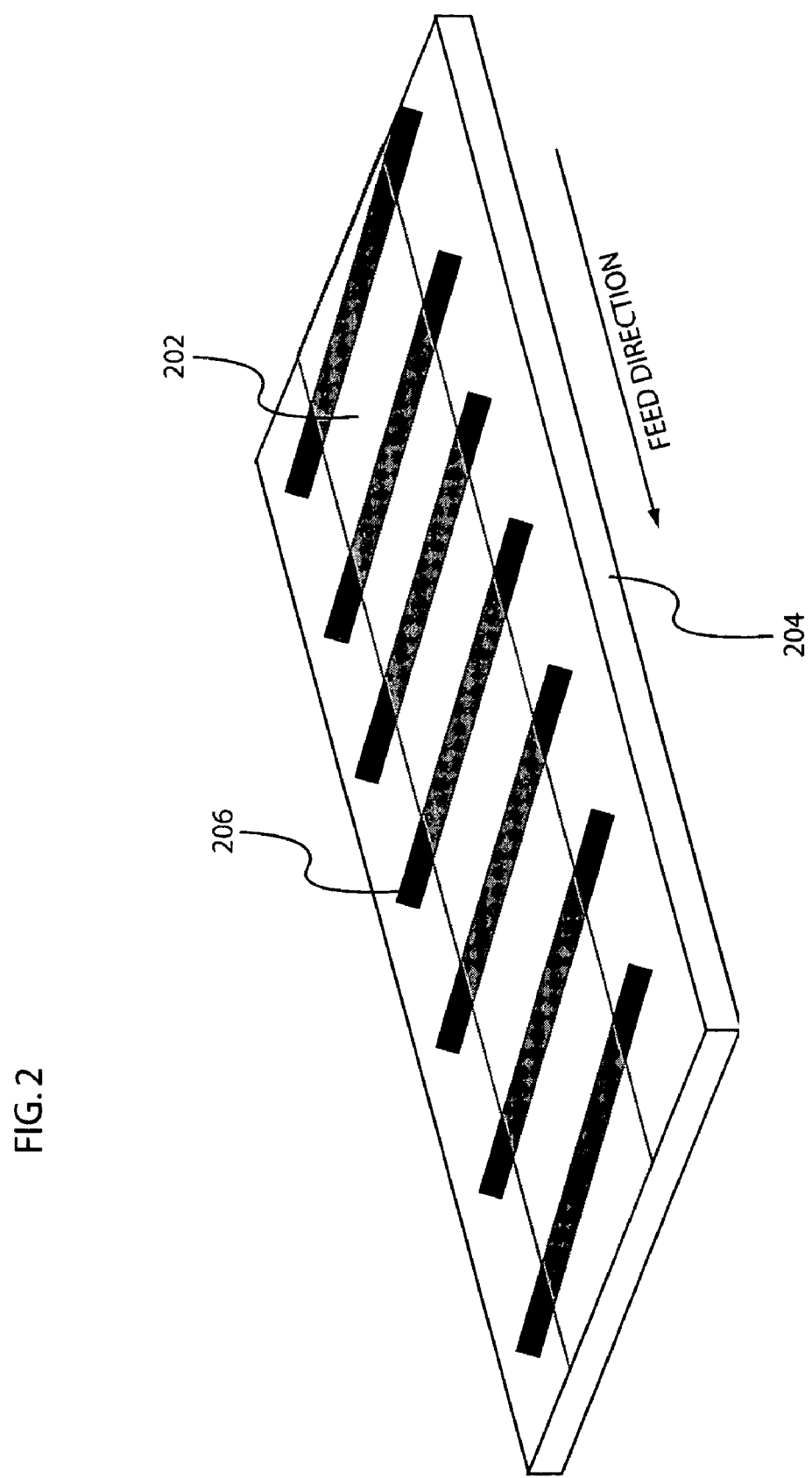
FIG. 2 illustrates an upper surface view of a reinforced tape in accordance with an embodiment of the present invention.

Turning to FIG. 2, a view of the upper surface of a segment of reinforced tape in accordance with the present invention is provided. As described above, the plastic reinforcing strip 202 is centered on the paper base layer 204 and overlaps a portion of the tamper indicator pattern 206.

Figure 3:
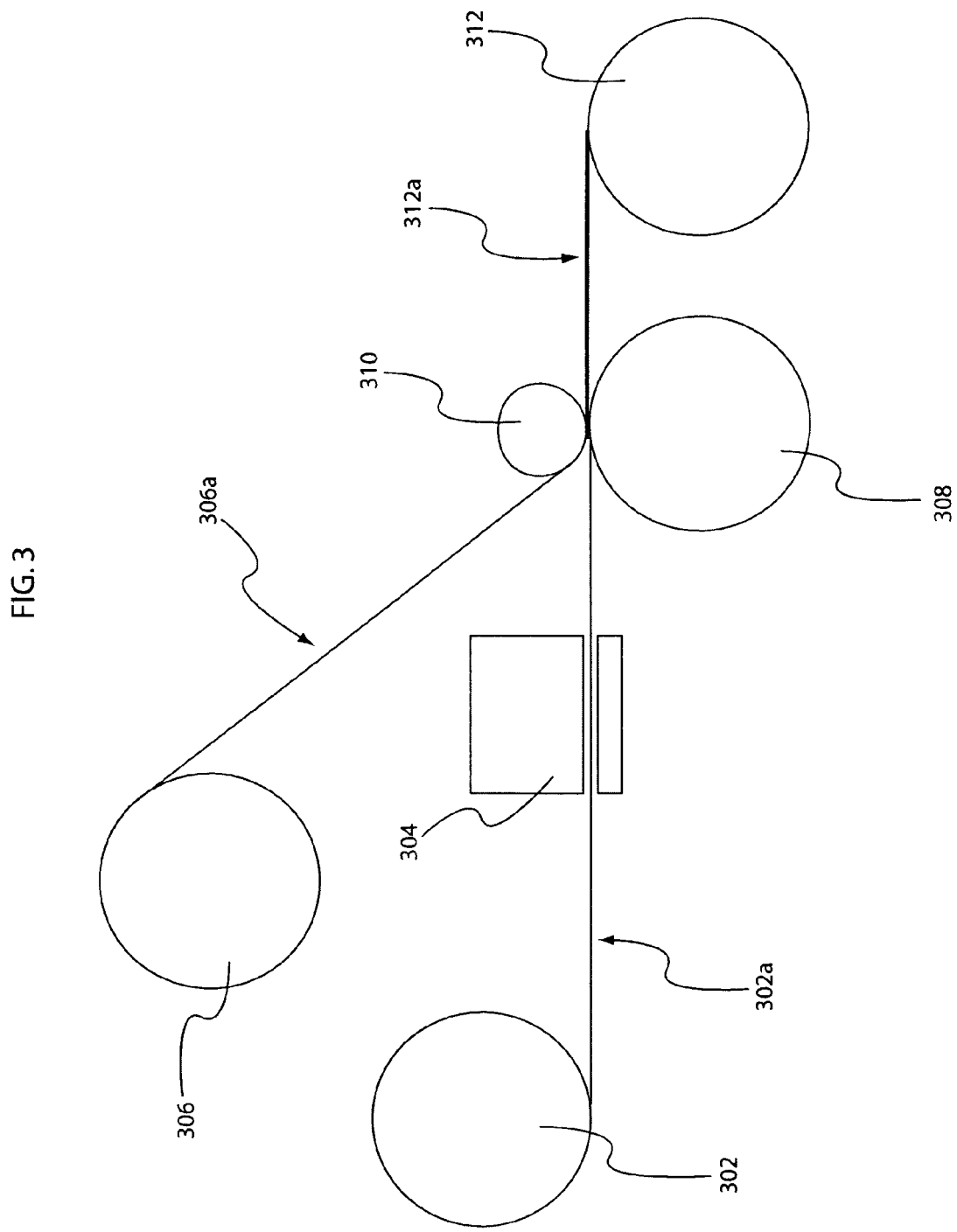
FIG. 3 illustrates a method for fabricating a reinforced tape in accordance with an embodiment of the present invention.

With reference to FIG. 3, fabrication of a reinforced tape of the present invention will be described. A first roll 302 consisting of a kraft paper 302a non-reinforced water-activated gummed sealing tape is provided. The kraft paper 302a of the first roll 302 may be preprinted with a tamper indicator pattern, or the tamper indicator pattern may be printed during manufacture of the reinforced tape. 312a. If the tamper indicator pattern is printed during manufacture of the reinforced tape 312a, then the kraft paper tape 302a is fed to a printing means 304 for imprinting of a stock or custom tamper indicator pattern.

A second roll 306 supplies a plastic reinforcing film 306a. The printed kraft paper 302a and the plastic reinforcing film 306a are fed to a knurled roller 308 and a nip roller 310, which is used to apply pressure on top of the knurled roller 308. The pressure creates a slight embossing of the plastic reinforcing film 306a helping it adhere to the ink of the tamper indicator pattern and the kraft paper 302a. The nip roller 310 is also needed to squeeze out any air that may get trapped between the kraft paper 302a and the plastic reinforcing film 306a. The formed reinforced tape 312a is rolled onto a take-up roller 312. One machine appropriate for use in the manufacture of the reinforced tape in accordance with the present invention is the Siat L-33 flexographic press, however any similarly flexographic press may be used as well.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A packing tape for sealing cardboard cartons used in shipping, said packing tape comprising:
   a base layer formed of paper, said base layer having an upper surface and a lower surface;
   a water-activated adhesive coating applied to said lower surface of said base layer;
   a tamper indicator pattern imprinted on said upper surface of said base layer; and
   a transparent reinforcing film, said reinforcing film being disposed on and bonded to said upper surface of said base layer, said transparent reinforcing film partially overlays said tamper indicator pattern, said transparent reinforcing film being adapted for visibly altering said tamper indicator pattern when an attempt is made to remove said transparent reinforcing film.

2. The packing tape as in claim 1, wherein said reinforcing film is oriented lengthwise and centered on said base layer.

3. The packing tape as in claim 1, wherein said base layer is formed of kraft paper.

4. The packing tape as in claim 1, wherein said base layer has a thickness in the range of between 35 lb and 90 lb.

5. The packing tape as in claim 1, wherein said reinforcing film is a plastic film having a lower surface contacting said base layer coated with a strong paper/plastic adhesive.

6. The packing tape as in claim 5, wherein said plastic film is polypropylene plastic.

7. The packing tape as in claim 5, wherein said plastic film is poly-vinyl-chloride (PVC) plastic.

8. A method for manufacturing a reinforced packing tape with tamper indication, said method comprising:
   providing a first roll of kraft paper having a lower surface coated with a water-activated adhesive, said kraft paper forming a base layer of said reinforced packing tape;
   providing a second roll of a reinforcing film having a lower surface coated with a strong paper/plastic adhesive;
   printing a tamper indicator pattern on an upper surface of said kraft paper; and
   joining said printed kraft paper with said reinforcing film, said joining bonding said lower surface of said reinforcing film to said upper surface of said printed kraft paper and partially overlaying said tamper indicator pattern, said reinforcing film being adapted for visibly altering said tamper indicator pattern when an attempt is made to remove said reinforcing film.

9. The method as in claim 8, wherein said reinforcing film is oriented lengthwise and centered on said base layer.

10. The method as in claim 8, wherein said base layer has a thickness in the range of between 35 lb and 90 lb.

11. The method as in claim 8, wherein said reinforcing film is a plastic film.

12. The method as in claim 11, wherein said plastic film is polypropylene plastic.

13. The method as in claim 11, wherein said plastic film is poly-vinyl-chloride (PVC) plastic.

* * * * *